United States Patent [19]

Onishi et al.

[11] Patent Number: 5,261,638
[45] Date of Patent: Nov. 16, 1993

[54] PIPE CONNECTION DEVICE

[75] Inventors: Toshihiko Onishi, Kakogawa; Morio Wakita; Katsumi Tomioka, both of Kobe; Masaaki Inoue, Ono; Yuji Kondo, Akashi, all of Japan

[73] Assignees: Cejn AB, Skovde, Sweden; Nabco Ltd., Kobe, Japan

[21] Appl. No.: 28,161

[22] Filed: Mar. 9, 1993

[30] Foreign Application Priority Data

Mar. 10, 1992 [JP] Japan .................. 4-087729

[51] Int. Cl.⁵ .......................................... F16L 37/28
[52] U.S. Cl. ............................. 251/149.7; 137/614.04
[58] Field of Search .................. 251/149.6, 149.7; 137/614.04, 614.03; 285/9.2, 379

[56] References Cited

U.S. PATENT DOCUMENTS

| | | | |
|---|---|---|---|
| 4,527,587 | 7/1985 | Fairlamb | 251/149.6 X |
| 4,613,112 | 9/1986 | Phlipot et al. | 251/149.6 |
| 4,848,728 | 7/1989 | Ekman | 251/149.6 |
| 4,962,881 | 10/1990 | Otsuki et al. | 251/149.7 |
| 4,967,999 | 11/1990 | Otsuki et al. | 251/149.7 |
| 4,989,831 | 2/1991 | Ootsuki et al. | 251/149.7 |

FOREIGN PATENT DOCUMENTS 53-3747 2/1978 Japan .

Primary Examiner—Martin P. Schwadron
Assistant Examiner—Kevin L. Lee
Attorney, Agent, or Firm—Wegner, Cantor, Mueller & Player

[57] ABSTRACT

A connection device attached to an outlet end of a pipe of pressurized fluid such as compressed air and used for connecting the pipe to a supply inlet of a utilization device, having an automatically operated valve built therein and arranged to be opened by only pressing it against the inlet of the utilization device to supply the pressurized fluid to the utilization device and closed by only separating it from the inlet of the utilization device to shut off any leakage of the fluid. In the device of this invention, the structure and arrangement of the automatic valve are improved for enabling size reduction of the device. Accordingly, the device of this invention is especially suitable in the case where a plurality of devices are arranged on a single base member and plural pipes connected thereto are automatically connected to and disconnected from corresponding plural utilization devices at the same time.

4 Claims, 3 Drawing Sheets

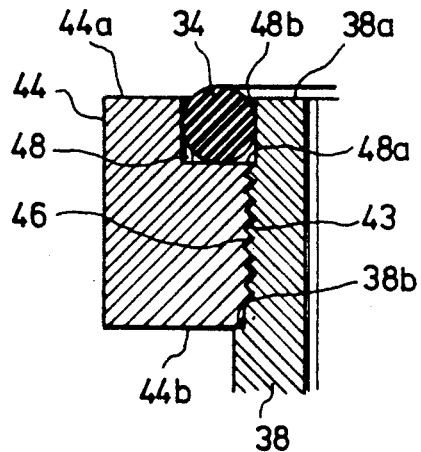
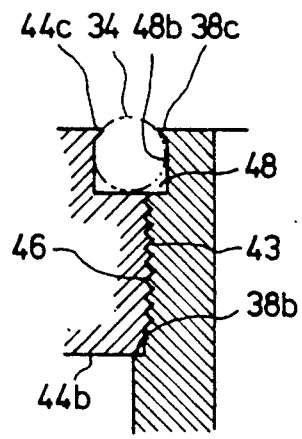
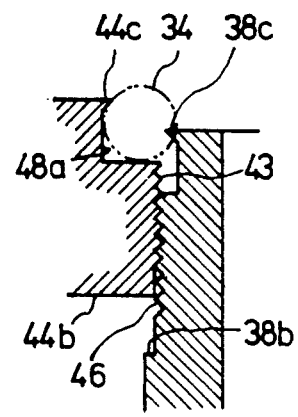
FIG. 5    FIG. 6a    FIG. 6b
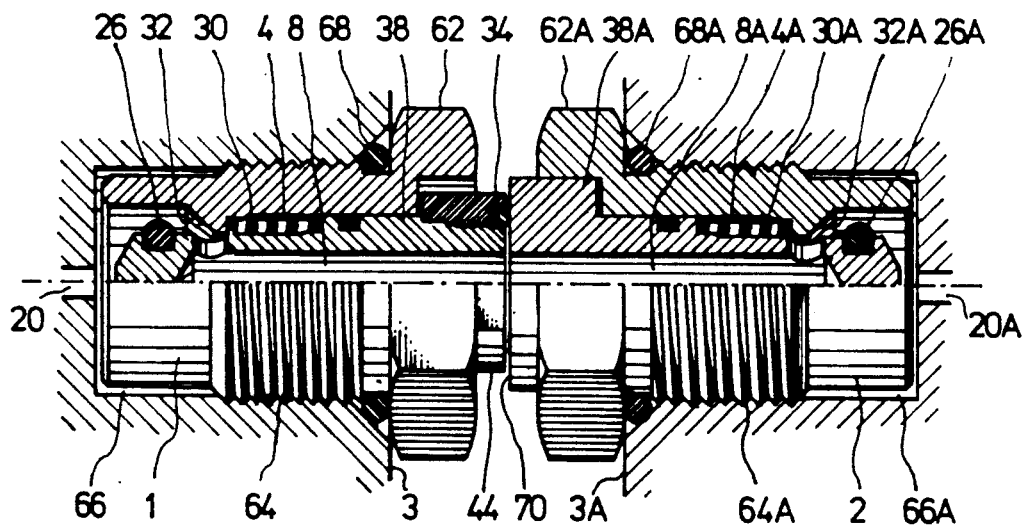
FIG. 7

PIPE CONNECTION DEVICE

BACKGROUND OF THE INVENTION

This invention relates to a pipe connection device for connecting and disconnecting a pipe of pressurized fluid such as compressed air to and from a supply inlet of a utilization device such as machine tool or testing equipment and, especially, to such device provided with an automatic valve built therein and arranged to complete connection by only pressing against the inlet of the utilization device and completely shut off leakage of the fluid after disconnection.

An example of the pipe connection devices of this kind is disclosed in the Japanese patent publication No. S53-3747 which is cited herein as a reference. As shown in FIG. 1, this device includes first and second connectors 1 and 2 which are facing each other and capable of relative forward and backward movement. The first connector 1 includes a cylindrical valve body 4 being fit slidably in a circular hole 6 formed therein and having a central passageway 8 and the second connector 2 has a passageway 10 smaller in diameter than the passageway 8, which is formed coaxially with the passageway 8 and connected to the utilization device. The central passageway 8 in the valve body 4 is opened to the side face of the valve body 4 through lateral holes 12 penetrating the side wall thereof. In the drawing, the lower end of the slide hole 6 connects with a cylindrical cavity 14 having a larger diameter than the slide hole 6 and opening at the bottom face of the first connector 1, and the lower end of the cavity 14 is closed with a plug member 16 and a stop ring 18. The plug member 16 has a central screw hole 20 for connecting a pressurized pipe (not shown) thereto. The valve body 4 and the plug member 16 have annular grooves formed in their side faces and O-rings 22 and 24 fit respectively therein for preventing leakage.

An annular sealing member 26 having an outer diameter larger than that of the valve body 4 is attached to the lower end of the valve body 4 and supported by a stop ring 28 fixed to the bottom of the valve body. The valve body 4 is constantly urged upwards by a spring 30 inserted between the valve body and the plug member 16 and the sealing member 26 is thereby pressed against a valve seat 32 formed at the upper end of the cavity 14 to form a closed valve state. An annular groove is formed in the upper end of the side wall of the valve body 4 and an O-ring 34 is fit therein and further fixed by spreading the upper end of the passageway 8.

When the second connector 2 is moved downwards from the position as shown, its lower face abuts first against the O-ring 34 to complete air-tight coupling between the passageways 8 and 10 and, next, the valve body 4 is pushed down against the spring 30 to open the lateral holes 12 into the cavity 14. Thus, an open valve state is achieved and the pressurized pipe (not shown) connected to the screw hole 20 is connected to the utilization device. If the second connector 2 is moved upwards from this state, the valve body 4 is pushed up by the spring 30 to press the sealing member 26 against the valve seat 32 to form a closed valve state. The lower face of the second connector 2 leaves thereafter the O-ring 34 of the valve body 4 and, therefore, the pressurized fluid in the cavity 14 does not leak out at all.

In this connection device, however, the side wall of the valve body 4 needs a substantial thickness since the annular groove is formed in the end face of the side wall and the sealing O-ring is fit therein and, moreover, the length of the device is longer than the total length of the valve body 4 and the spring 30 since they are arranged in series. In other words, this device has such a disadvantage in that the axial and diametral sizes thereof cannot be reduced over the above-mentioned limit due to its structural cause. This problem may be fatal when a plurality of such connection devices are to be arranged within a narrow space for use.

Accordingly, an object of this invention is to provide an improved pipe connection device having a novel structure which can significantly reduce the above-mentioned axial and diametral sizes.

SUMMARY OF THE INVENTION

According to this invention, there is provided a pipe connection device, which can achieve the above-mentioned object, comprising first and second connectors which face one another and can move forwards and backwards with respect to each other and which have substantially coaxial fluid passageways to be connected to pipes respectively connecting with a pressurized fluid source and a utilization device. The first connector further includes a cylindrical valve body having the passageway along its central axis and a cylindrical cavity for receiving the valve body as in the above-mentioned prior art device.

According to a feature of this invention, however, the valve body includes a large diameter portion adjacent to an end thereof, a valve head portion adjacent to the other end thereof and a small diameter portion between the large diameter portion; and the valve head portion and the passageway of the valve body has its outer end opened at the end face of the large diameter portion and an inner end opened at the side face of the small diameter portion. The cylindrical cavity includes a slide hole portion which slidably receives the large diameter portion of the valve body, a valve opening which adjoins the slide hole portion and allows the valve head portion to pass therethrough and a valve seat which adjoins the valve opening.

According to another feature of this invention, the large diameter portion of the valve body includes at the top a screw portion and a nut screwed on the screw portion and the nut has an annular groove formed in the end face thereof in which an annular sealing member is fit.

According to a further feature of this invention, the valve head portion is provided with a valve member composed of a sealing member having a larger diameter than the valve opening and the valve member is urged against the valve seat by a spring disposed around the small diameter portion.

When the first and second connectors are butted against each other through the annular sealing member, the valve body is thereby pushed into the cylindrical cavity against the spring and the valve member is separated from the valve seat to open the valve and connect both pipes. When the first and second connectors move apart from each other in this state, the valve member is first pressed against the valve seat by the spring to close the valve and the second connector thereafter leaves the annular sealing member to prevent any leakage of the pressurized fluid.

Moreover, since no groove for receiving the annular sealing member is formed in the end face of the valve body and the spring is disposed around the valve body, the diametral and axial sizes of the device can be reduced.

These and other features and functions of this invention will be described in more detail below with reference to the accompanying drawings in connection with some embodiments thereof.

BRIEF DESCRIPTION OF THE DRAWINGS

In the drawings:

FIG. 5 is a partial sectional view showing a sealing member attaching structure as a feature of the pipe connection device of this invention;

FIGS. 6a and 6b are schematic sectional views showing a modification of the sealing member attaching structure of FIG. 5 and an operation thereof; and FIG. 7 is a partially sectional side view showing another embodiment of the pipe connection device according to this invention.

Throughout the drawings, same reference numerals are given to mutually corresponding structural components.

DESCRIPTION OF PREFERRED EMBODIMENTS

Figure 2:
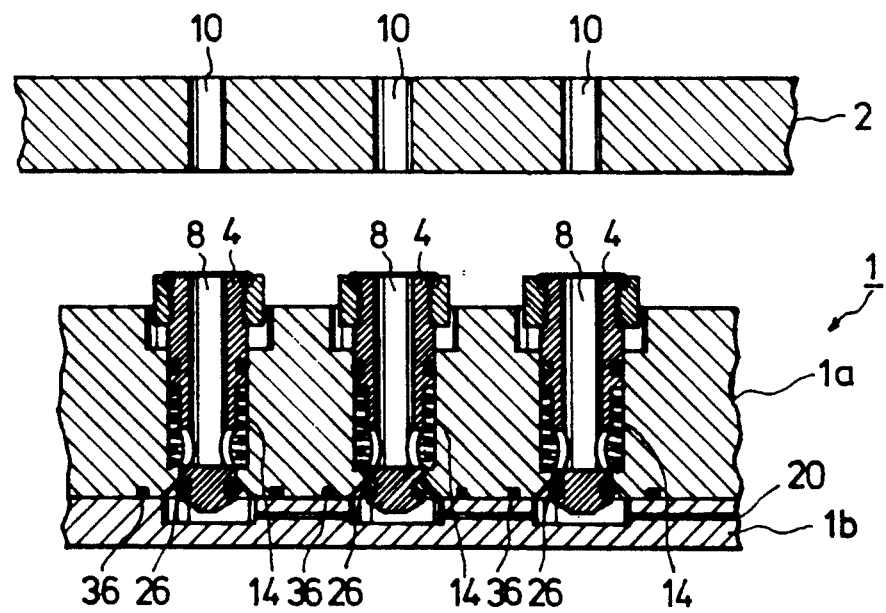
FIG. 2 is a sectional side view showing an embodiment of multiplex pipe connection device according to this invention.

Referring to FIG. 2, this embodiment includes first and second connectors 1 and 2 of thick plate block type which face one another and the first connector 1 includes a plurality of (three, in the drawing) cylindrical cavities 14 and a plurality of valve bodies 4 inserted therein. The second connector 2 has passageways 10 formed therein in substantially coaxial relationship with the valve bodies 4 in the first connector 1 and, though not shown in the drawing, the passageways 10 are connected respectively to a plurality of utilization devices through suitable pipes. As shown, the first connector 1 is composed of two layers 1a and 1b which are detachably coupled together through sealing O-rings 36. This is for the purpose of attaching an O-ring valve member 26 to a valve head at the lower end of each valve body 4, as described below. The lower layer 1b of the connector 1 has a passageway 20 for connecting the cavities 14 to a pressurized fluid source (not shown).

Figure 3:
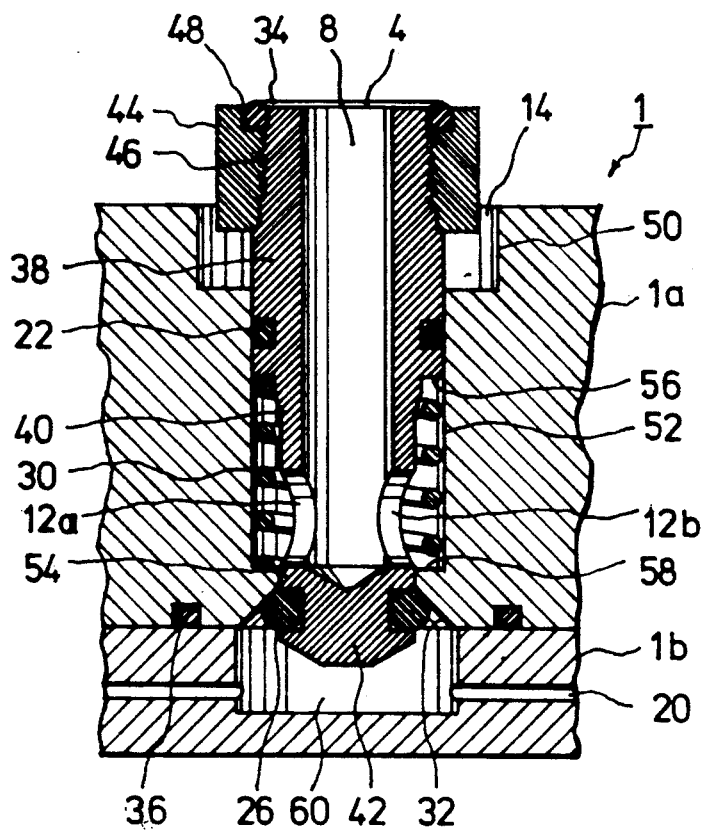
FIG. 3 is an enlarged sectional side view showing in detail a part of the embodiment of FIG. 2.

As shown in FIG. 3, each valve body 4 consists of a large diameter portion 38 adjacent to an end thereof, a valve head portion 42 adjacent to the other end thereof and a small diameter portion 40 therebetween; and the large diameter portion 38 has a screw portion 46 formed at its end and provided with a bifacial nut 44 screwed thereon. The nut 44 has an annular groove 48 formed in its top face and a sealing O-ring 34 is fit therein. The valve head portion 42 is substantially same in diameter as the small diameter portion 40 and has a peripheral groove in which an O-ring 26 is fit for use as a valve member.

The valve cavity 14 consists of a large diameter portion 50 having the nut 44 loosely fit therein, a slide hole portion 52 adjoining the portion 50 and having the large diameter portion 38 of the valve body slidably fit therein through a sealing O-ring 22, a valve opening 54 adjoining the slide hole portion 52 and allowing the valve head portion 42 to pass therethrough and a valve seat 32 adjoining the valve opening 54. Between the small diameter portion 40 of the valve body 4 and the slide hole portion 52 of the cavity 14, there is a compression spring 30 having both ends supported by a step 56 between the large diameter portion 38 and small diameter portion 40 of the valve body and another step 58 between the slide hole portion 52 and valve opening 54 of the cavity and surrounding the small diameter portion 40, for constantly pressing the above-mentioned valve member 26 against the valve seat 32 from the outside or underside thereof. The valve body 4 has a central passageway 8 having its upper end opened at the top or front face of the valve body 4 and its bottom end opened through lateral holes 12a and 12b at the side face of the small diameter portion 40. The lower layer 1b has a depression 60 facing the valve head 42 and connecting with a pressurized fluid source (not shown) through the passageway 20.

In case of assembling the first connector 1, the spring 30 is first inserted in the valve cavity 14 and the valve body 4 attached with the O-ring 22 is then inserted therein. Next, the valve body 4 is pushed down against the spring 30 to protrude the valve head 42 from the bottom face of the upper layer 1a and, then, the O-ring 26 as the valve member is fit in the peripheral groove of the valve head 42. If the valve body 4 is released thereafter, the valve member 26 is pressed against the valve seat 32 by the spring 30. Further, the nut 44 is attached to the valve body 4 and the sealing member 34 is fit in the annular groove 48. At last, the upper layer 1a of the connector 1 is put on the lower layer 1b, with O-ring 36 sealing therebetween, and both layers are tightly coupled with suitable means such as bolts (not shown).

Figure 4:
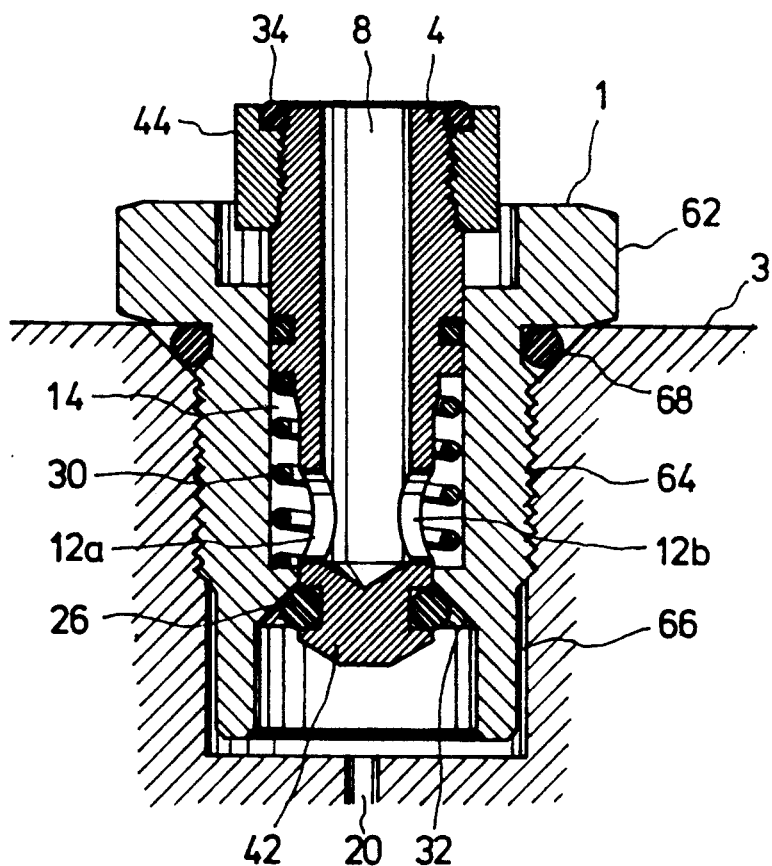
FIG. 4 is an enlarged sectional side view showing a modification of the embodiment of FIG. 3.

Although the modification of FIG. 4 is almost the same as the embodiment of FIG. 3 in structural arrangement of the valve body 4 and cavity 14, the first connector 1 is exclusively occupied by each valve body 4 and has a specific shape as shown. More particularly, the first connector 1 includes a hexagonal nut-shaped head portion 62 and an adjoining screw portion which are coaxial with the valve body 4, and it is screwed in a circular depression 64 formed in a separate movable member 3 through a sealing O-ring 68. The depression 64 is connected through a passageway 20 to a pressurized fluid source (not shown). In this modification also, it is possible to form a structure similar to that of FIG. 2 by forming a plurality of circular depressions 64 in the movable member 3 and screwing the assembly of the connector and valve body as shown in FIG. 4 in each depression and to use it in the same fashion. The other structure is similar to the embodiment of FIG. 3 and obvious from the drawings and, therefore, no further descriptiin will be made thereon.

The method of assembling this modified device is substantially same as that of the device of FIG. 3. However, no bilayer structure as shown in FIG. 3 is needed since the first connector 1 is an individual component which is fixed to the movable member 3 after it is assembled. This modification is convenient for precise working and mass-production of the device, since the first connector assembly can be produced as a unit. However, its possible packing density may be reduced since the diametral size of each unit is increased.

In the case of connecting the above-mentioned first connector 1 to the second connector 2 (FIG. 2), when both connectors draw near and the front face of the second connector 2 abuts against the annular sealing member 34 on the front face of the valve body 4 of the first connector 1, the passageways 8 and 10 of both connectors are sealed first from the outside. With further approach of both connectors, the annular sealing member 34 is crushed a little to raise its sealing power and the valve body 4 is then pushed down against the spring 30 to separate the valve member 26 from the valve seat to open the valve opening 54 first and expose the lateral holes 12a and 12b of the passageway 8 below the valve seat 32 directly thereafter. Therefore, this valve increases its aperture abruptly like a poppet valve. When both connectors 1 and 2 are separated, the valve body 4 is pushed up by the spring 30 to press the valve member 26 to the valve seat 32 to close the valve opening 54 first and the front face of the second connector 2 leaves the annular sealing member 34 thereafter. In other words, tight connection between both passageways 8 and 10 is completed before opening of the valve and released after closure thereof and, therefore, pipe connection and disconnection are effected automatically without any leakage of the pressurized fluid. Since both connectors are connected between the annular sealing member 34 of the first connector 1 and the front face of the second connector 2, a little deviation between the passageways 8 and 10 of both connectors can be accepted. Moreover, since the valve body 4 is urged against the second connector 2 by the spring 30 in the state of connection, a little variation of the distance between both connectors due to vibration or the like is absorbed by the spring and there will be no damage of the connection.

As shown in FIG. 5, the annular groove 48 for supporting the annular sealing member 34 is composed of a step 48a formed at the front end of the screw hole 43 of the bifacial nut 44 and a front end portion 48b of the side face of the large diameter portion 38 of the valve body 4. The screw portion 46 of the large diameter portion 38 has a step 38b formed at the rear end thereof and the axial length or height of the nut 44 is selected so that the front end face 44a of the nut 44 flushes with the front end face 38a of the larger diameter portion 38 when the rear end face 44b of the nut 44 abuts against the step 38b. In order to secure the annular sealing member 34 in the annular groove 48, mutually facing projections 38c and 44c may be formed at the inner and outer edges of the annular groove 48 as shown in FIG. 6a. In this case, the annular sealing member 34 can be attached as shown (in phantom) in FIG. 6a by fitting it in the step portion 48a in the way of attaching the nut 44 as shown in FIG. 6b and, thereafter, tightening the nut 44 again. A similar effect is expected even if the side wall 48b of the annular groove 48 is provided with a screw as same as in the screw portion 46 instead of the inner projection 38c.

While, in the above-mentioned embodiments, the second connector 2 is assumed as a simple plate-shaped block having the passageway 10 facing the central passageway 8 of the first connector 1, its shape is not limited thereto. FIG. 7 shows an another embodiment having the second connector modified. Since the first connector 1 of this embodiment is exactly same in design as the embodiment of FIG. 4, its structure and operation will not be described further. The structure of the second connector 2 is also quite similar to that of the first connector 1 as shown. Therefore, its corresponding structural components are referenced with the same reference numerals added with "A" and no detailed description will be made thereon.

In FIG. 7, the second connector 2 is produced as a unit having one-to-one correspondence with the first connector 1. As same as the first connector 1, it has a hexagonal nut-shaped head portion 62A and a screw portion and is screwed in a circular depression 64A formed in a second movable member 3A corresponding to the first movable member 3. In contrast to the first connector 1, in the second connector 2, the large diameter portion 38A of the valve body 4A has no nut 44 and, instead, it increases its diameter further at the corresponding portion to enlarge the effective area of its butting face 68 against the annular sealing member 34 of the first connector 1. Since the first and second connectors of this device include similar poppet valves respectively, similar operations are effected in both connectors at the time of connection and disconnection of the piping and not only the passageway 8 of the first connector but also the passageway 10 of the second connector are closed at the time of disconnection. Accordingly, the fluid remaining in the utilization device after disconnection is prevented from leakage. This is advantageous when the fluid used is a fluid other than air, such as oil.

Figure 1:
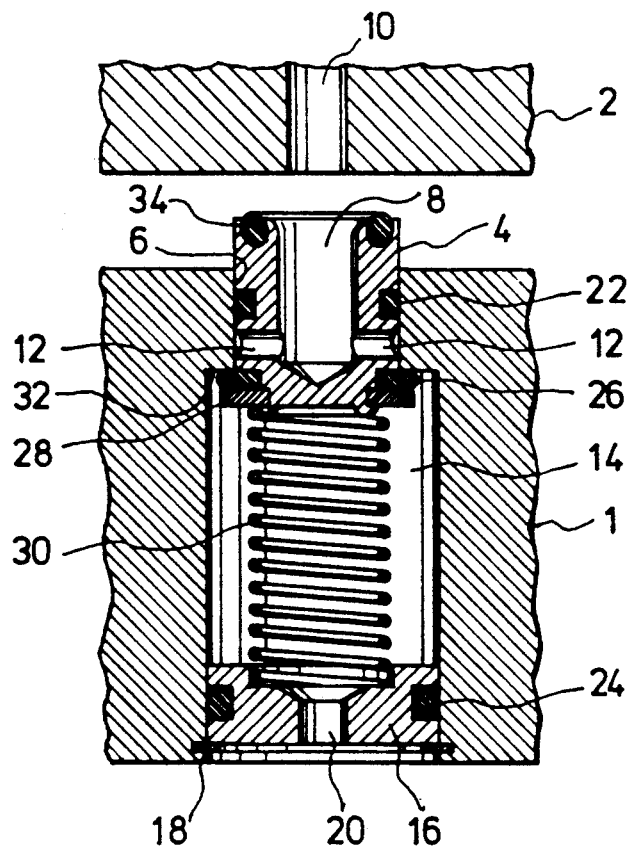
FIG. 1 is a sectional side view showing the above-mentioned pipe connection device according to the prior art.

As described above, the design of the second connector is optional and has no direct connection to this invention. It should be noted that the above embodiments have been presented for illustrative purpose only and do not mean any limitation of the invention. It is a matter of course that various modifications and changes can be made on these embodiments without leaving the spirit and scope of the invention as defined in the appended claims. For example, the cross-section of the sealing members may be of any shape other than circular shape, such as V-shape, as occasion demands, through O-rings of circular cross-section are used in the above embodiments. Moreover, the valve member 26 may be fixed to the valve head 42 of the valve body 4 with any other means such as stop ring 28 of FIG. 1 though it has been fit in the peripheral groove formed in the valve head 42.

We claim:

1. A pipe connection device comprising first and second connectors having substantially coaxial first and second fluid passageways respectively which are to be connected respectively to a pressurized fluid source and a utilization device, said connectors being faced to and movable forward and backward with respect to each other, said first connector including a cylindrical valve body having said first fluid passageway along its central axis, and a cylindrical inner cavity for receiving said valve body, and said second connector including a contact surface facing the forward end of said valve body; characterized in that:

said valve body includes a large diameter portion adjoining said forward end, a valve head portion adjoining the other end thereof, and a small diameter portion disposed between said large diameter portion and valve head portion;

said first fluid passageway has its forward end open at the forward end of, said large diameter portion and its rear end opened at a side face of said small diameter portion;

said inner cavity includes a slide hole portion slideably fitting with said large diameter portion of the valve body, a valve opening adjoining said slide hole portion and allowing said valve head portion to pass therethrough, and a valve seat adjoining said valve opening;

said large diameter portion of the valve body includes a screw portion formed adjacent to the forward end thereof, and a nut-shaped member screwed onto said screw portion;

said nut-shaped member includes an annular groove formed in the forward end face thereof, and an annular sealing member fit in said annular groove for abutting against said contact surface of the second connector; and said valve head portion includes a valve member greater in diameter than said valve opening, said valve member being urged against said valve seat by a spring disposed around said small diameter portion of the valve body.

2. A pipe connection device as set forth in claim 1, characterized in that said first connector is composed of a cylindrical unit coaxial with said valve body and having a screw portion on its outer side face, said device further comprises a base member movable forward and backward with respect to said second connector, and said first connector is screwed in a receptacle hole formed in said base member.

3. A pipe connection device as set forth in claim 1, characterized in that said annular groove formed in said nut-shaped member has inward projections at both edges thereof.

4. A pipe connection device as set forth in claim 1, characterized in that said spring is a compression spring disposed between a step between said large and small diameter portions of the valve body and a step between said slide hole portion and valve opening of the inner cavity.

* * * * *